(12) United States Patent
Hou et al.

(10) Patent No.: US 11,961,423 B2
(45) Date of Patent: Apr. 16, 2024

(54) ELECTRONIC SHELF LABEL POSITIONING SYSTEM AND METHOD, ELECTRONIC SHELF LABEL AND GUIDE RAIL

(71) Applicant: Hanshow Technology Co., Ltd., Zhejiang (CN)

(72) Inventors: Shiguo Hou, Zhejiang (CN); Jianguo Zhao, Zhejiang (CN); Min Liang, Zhejiang (CN); Le Zhuo, Zhejiang (CN); Sheng Yi, Zhejiang (CN); Yang Zhao, Zhejiang (CN); Yanwei Wang, Zhejiang (CN); Linjiang Wang, Zhejiang (CN)

(73) Assignee: HANSHOW TECHNOLOGY CO., LTD., Jiaxing (CN)

( * ) Notice: Subject to any disclaimer, the term of this patent is extended or adjusted under 35 U.S.C. 154(b) by 0 days.

(21) Appl. No.: 18/314,603

(22) Filed: May 9, 2023

(65) Prior Publication Data
US 2023/0274667 A1    Aug. 31, 2023

Related U.S. Application Data

(63) Continuation of application No. PCT/CN2021/134015, filed on Nov. 29, 2021.

(51) Int. Cl.
*G09F 3/20* (2006.01)
(52) U.S. Cl.
CPC .............. *G09F 3/208* (2013.01); *G09F 3/204* (2013.01)
(58) Field of Classification Search
CPC ............. G09F 3/208; G09F 3/204; G09F 3/18
(Continued)

(56) References Cited

U.S. PATENT DOCUMENTS

2011/0315566 A1* 12/2011 Boynton ................ A45C 11/16
                                                        206/459.5
2015/0348450 A1* 12/2015 Park ........................ G09F 3/208
                                                        340/5.91
(Continued)

FOREIGN PATENT DOCUMENTS

| CN | 109863518 A | 6/2019 |
| CN | 110348924 A | 10/2019 |

(Continued)

OTHER PUBLICATIONS

International Searching Authority, "International Search Report" and machine translation, issued in connection with International Patent Application No. PCT/CN2021/134015, dated Aug. 5, 2022, 8 pages.

(Continued)

*Primary Examiner* — Yong Hang Jiang
(74) *Attorney, Agent, or Firm* — Hanley, Flight & Zimmerman, LLC

(57) ABSTRACT

An electronic shelf label positioning system, an electronic shelf label and a guide rail. The electronic shelf label positioning system includes the electronic shelf label, the guide rail, a PDA and a background server. The electronic shelf label includes a main control SoC, a card reader IC, a screen and a power supply device. The main control SoC is configured to control the screen display and to communicate with an AP. The power supply device is configured to supply power to the electronic shelf label. The guide rail includes a guide rail identification area and a label area. The label area is installed with a plurality of wireless labels each having a unique non-repeated ID number. The guide rail identification area is installed with an identity recognition device, which includes a guide rail ID consisting of the ID numbers of the wireless labels sequentially arranged and summarized.

13 Claims, 5 Drawing Sheets

(58) Field of Classification Search
USPC .......................................................... 340/5.91
See application file for complete search history.

(56) References Cited

U.S. PATENT DOCUMENTS

| | | | |
|---|---|---|---|
| 2019/0362300 A1 | 11/2019 | Bottine et al. | |
| 2020/0402429 A1* | 12/2020 | Cho | G09F 3/208 |
| 2021/0026586 A1* | 1/2021 | Hu | G06K 17/00 |

FOREIGN PATENT DOCUMENTS

| | | | |
|---|---|---|---|
| CN | 111199258 A | | 5/2020 |
| CN | 108334912 B | | 10/2020 |
| CN | 111860748 A | * | 10/2020 |
| CN | 111860748 A | | 10/2020 |
| CN | 211928917 U | | 11/2020 |
| CN | 113256363 A | | 8/2021 |
| JP | 2008183133 A | | 8/2008 |
| JP | 2008272266 A | | 11/2008 |
| JP | 2019530080 A | | 10/2019 |
| KR | 20170009045 A | | 1/2017 |
| WO | 2021109927 A1 | | 6/2021 |

OTHER PUBLICATIONS

European Patent Office, "Extended European search report," issued in connection with European Patent Application No. 21958588.2, dated Jan. 22, 2024, 10 pages.

Japanese Patent Office, "Notice of Reasons for Refusal," issued in connection with Japanese Patent Application No. 2023-507723, dated Feb. 6, 2024, 5 pages. [English translation provided].

* cited by examiner

ELECTRONIC SHELF LABEL POSITIONING SYSTEM AND METHOD, ELECTRONIC SHELF LABEL AND GUIDE RAIL

CROSS-REFERENCE TO RELATED APPLICATIONS

This application is a continuation of International Application No. PCT/CN2021/134015, filed Nov. 29, 2021, which is hereby incorporated by reference in its entirety.

TECHNICAL FIELD

The present disclosure relates to the technical field of electronic shelf labels, and particularly to an electronic shelf label positioning system and method, an electronic shelf label and a guide rail.

BACKGROUND

This section is intended to provide the background or the context for the embodiments of the present disclosure set forth in the claims. The description here is not admitted as prior art by inclusion in this section.

The electronic shelf label applied to the retail stores and supermarkets can realize flexible price management, and the retailers have a clear demand on the positioning function of the electronic shelf label. It is important for both the retailers and the consumers to acquire the accurate position of the electronic shelf label. From the perspective of the retailer management, the accurate position information can be utilized to generate optimized picking and replenishment paths, thus improving the operation efficiency. The consumers can get the optimized shopping paths and improve the shopping experiences.

The existing positioning methods include the triangulation. Access Points (APs) are deployed at three definite positions (x1, y1) (x2, y2) (x3, y3), and an electronic shelf label at position E receives wireless signals from three APs (BS1, BS2 and BS3). Distances r1, r2 and r3 from the electronic shelf label to BS1, BS2 and BS3 may be estimated through received signal strengths RSSIs, and the position of the point E may be obtained by calculating an intersection area of three circles shown in FIG. 1.

The triangulation has the following disadvantages: in the actual environment, the wireless signal is uncertain, and the multipath and fading of the signal will cause the RSSI to change greatly, so it is difficult to obtain the accurate distance. In the retail scene, due to the obstruction and attenuation of signals by the shelves and the customers, the complexity of the wireless environment is aggravated, the positioning accuracy is greatly affected, and generally only an accuracy of a few meters can be achieved. In the scene of stores and supermarkets, a deviation of more than 80 cm will lead to a channel position error, and the accuracy cannot meet the needs of the retailers.

The existing positioning methods further include UWB positioning, which adopts the principle of Time Difference Of Arrival (TDOA). As illustrated in FIG. 2, an electronic shelf label repeatedly and uninterruptedly broadcasts data frames to the surrounding modules with nanosecond narrow pulses. Each positioning module uses a high-sensitivity receiver to measure the time when the data frames arrive at an antenna of the receiver, and uses a time difference of radio signals propagated between different positioning base stations to obtain a distance difference of the electronic shelf label relative to multiple groups of positioning modules. According to the time difference of the signal arriving at two modules, it can be determined that a positioning label is positioned on a hyperbola with the two modules as focuses. If there are more than three base stations, a plurality of hyperbolic equations can be established, and intersections of these hyperbolic equations are two-dimensional coordinates of the shelf label.

The UWB positioning has the following disadvantages:
1. The UWB system needs to be deployed separately, and the UWB signal attenuates faster, so it is necessary to add the positioning base stations intensively, which increases the device investment cost for the retailers.
2. The UWB positioning has high requirements for implementing deployment, and the concrete wall or metal has a strong attenuation to UWB signals, resulting in a poor positioning accuracy or invalid positioning.
3. The UWB solution leads to a large power consumption of the label, which cannot meet the retailer's requirement for a service life of 5 to 10 years of the electronic shelf label.

SUMMARY

The embodiments of the present disclosure provide an electronic shelf label, including a main control SoC, a card reader IC, a screen and a power supply device. The main control SoC is configured to control the screen display and to communicate with an AP. The card reader IC is configured to read a wireless label. The power supply device is configured to supply power to the electronic shelf label.

The embodiments of the present disclosure further provide a guide rail for installing the electronic shelf label aforementioned, and the guide rail includes a guide rail identification area and a label area. The label area is installed with a plurality of wireless labels each having a unique non-repeated ID number. The guide rail identification area is installed with an identity recognition device, which comprises a guide rail ID consisting of the ID numbers of the wireless labels sequentially arranged and summarized.

The embodiments of the present disclosure further provide an electronic shelf label positioning system, including the electronic shelf label aforementioned, the guide rail aforementioned, a PDA and a background server. The guide rail is installed on a commodity shelf. The PDA is configured to: scan a commodity shelf ID and a guide rail ID to form a binding relationship between a shelf and the guide rail ID, scan an electronic shelf label ID and a commodity ID to form a binding relationship between the electronic shelf label and a commodity, and transfer the binding relationships to the background server. The electronic shelf label is configured to read a wireless label ID on the guide rail and transfer the wireless label ID to the background server. The background server is configured to: send commodity and price information to be displayed on the electronic shelf label, determine the guide rail ID based on the wireless label ID, determine shelf information based on the guide rail ID and the binding relationship between the shelf and the guide rail ID, and obtain a corresponding position of the electronic shelf label based on the shelf information.

The embodiments of the present disclosure further provide an electronic shelf label positioning method, including: scanning, by a PDA, a commodity shelf ID and a guide rail ID to form a binding relationship between a shelf and the guide rail ID; scanning, by the PDA, an electronic shelf label ID and a commodity ID to form a binding relationship between an electronic shelf label and a commodity; and transferring, by the PDA, the binding relationship to a background server; reading, by the electronic shelf label, a wireless label ID on a guide rail, and transferring, by the electronic shelf label, the wireless label ID to the background server; sending, by the background server, commodity and price information to be displayed on the electronic shelf label; determining, by the background server, the guide rail ID based on the wireless label ID; determining, by the background server, shelf information based on the guide rail ID and the binding relationship between the shelf and the guide rail ID; and obtaining, by the background server, a corresponding position of the electronic shelf label based on the shelf information. The electronic shelf label is the electronic shelf label aforementioned, the guide rail is the guide rail aforementioned, and the guide rail is installed on a commodity shelf.

The embodiments of the present disclosure further provide a computer device, comprising a memory, a processor, and a computer program stored in the memory and executable on the processor, wherein the processor is configured to execute the computer program to implement the electronic shelf label positioning method aforementioned.

The embodiments of the present disclosure further provide a computer-readable storage medium storing a computer program which, when executed by a processor, implements the electronic shelf label positioning method aforementioned.

The embodiments of the present disclosure further provide a computer program product, comprising a computer program which, when executed by a processor, implements the electronic shelf label positioning method aforementioned.

Compared with the technical solutions of triangulation and UWB positioning in the prior art, the embodiments of the present disclosure provide an electronic shelf label positioning system including an electronic shelf label, a guide rail, a PDA and a background server. The electronic shelf label includes a main control SoC, a card reader IC, a screen and a power supply device. The main control SoC is configured to control the screen display and to communicate with an AP. The IC card reader is configured to read a wireless label. The power supply device is configured to supply power to the electronic shelf label. The guide rail includes a guide rail identification area and a label area. The label area is installed with a plurality of wireless labels each having a unique non-repeated ID number. The guide rail identification area is installed with an identity recognition device, which includes a guide rail ID consisting of the ID numbers of the wireless labels sequentially arranged and summarized. Through the electronic shelf label and the guide rail provided, the present disclosure achieves the accurate positioning of the electronic shelf label and the commodity, and the performance is stable and reliable, without being affected by a wireless environment.

BRIEF DESCRIPTION OF THE DRAWINGS

For a clearer illustration of technical features in the embodiments of the present disclosure or the prior art, a brief description of the drawings for the embodiments or the prior art will be given below. Obviously, the drawings described below involve only some embodiments of this disclosure. For those of ordinary skill in the art, other drawings can be derived from these drawings without any inventive efforts. In the drawings.

DETAILED DESCRIPTION

For a clearer understanding of the objectives, technical features and effects of the embodiments of the present disclosure, specific embodiments will now be described with reference to the drawings. The described embodiments are intended only to schematically illustrate and explain this invention and do not limit the scope of the present disclosure.

Figure 1:
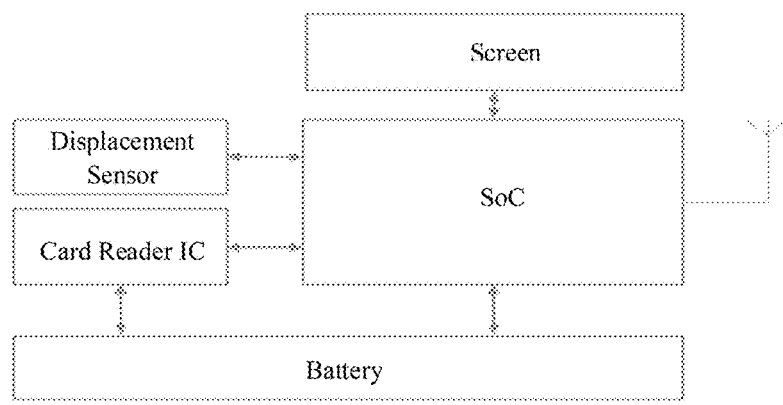
FIG. 1 is a schematic structural diagram of an electronic shelf label according to an embodiment of the present disclosure.

The present disclosure provides an electronic shelf label, the structure of which is illustrated in FIG. 1. The electronic shelf label includes a main control SoC, a card reader IC, a screen, and a power supply device (i.e., a battery).

The main control SoC is configured to control the screen display and to communicate with an AP.

The card reader IC is configured to read a wireless label.

The power supply device is configured to supply power to the electronic shelf label.

Specifically, the AP is a wireless access point. Generally, the SoC is called as a system on chip, which is an integrated circuit with a special purpose. The SoC contains a complete system and has embedded software in its entirety.

As illustrated in FIG. 1, the embodiment of the present disclosure further includes a displacement sensor configured to detect whether the electronic shelf label moves.

Specifically, whether the electronic shelf label moves may be judged by the displacement sensor, and it may be set to read label information (wireless label information) after the electronic shelf label moves and stops again, thus reducing the power consumption.

On this basis, the main control SoC is further configured to control the card reader IC based on a displacement signal detected by the displacement sensor.

Figure 2:
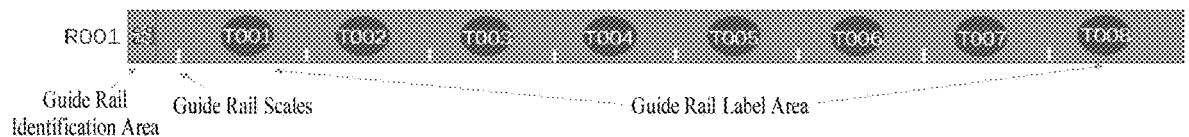
FIG. 2 is a schematic structural diagram of a guide rail according to an embodiment of the present disclosure.

The present disclosure provides a guide rail, the structure of which is illustrated in FIG. 2. The guide rail is configured to install the aforementioned electronic shelf label. The guide rail includes a guide rail identification area and a label area.

The label area is installed with a plurality of wireless labels each having a unique non-repeated ID number.

The guide rail identification area is installed with an identity recognition device, which includes a guide rail ID consisting of the ID numbers of the wireless labels sequentially arranged and summarized.

Specifically, the identity recognition device is a guide rail label in which the guide rail ID is written. Alternatively, the identity recognition device is a two-dimensional code generated by the guide rail ID.

Specifically, the guide rail label and the plurality of wireless labels are fixed on the guide rail by means of pasting or side insertion.

In the embodiment of the present disclosure, as illustrated in FIG. 2, the guide rail further includes scales for assisting an alignment of commodities, i.e., helping shop assistants to align the commodities.

Figure 3:
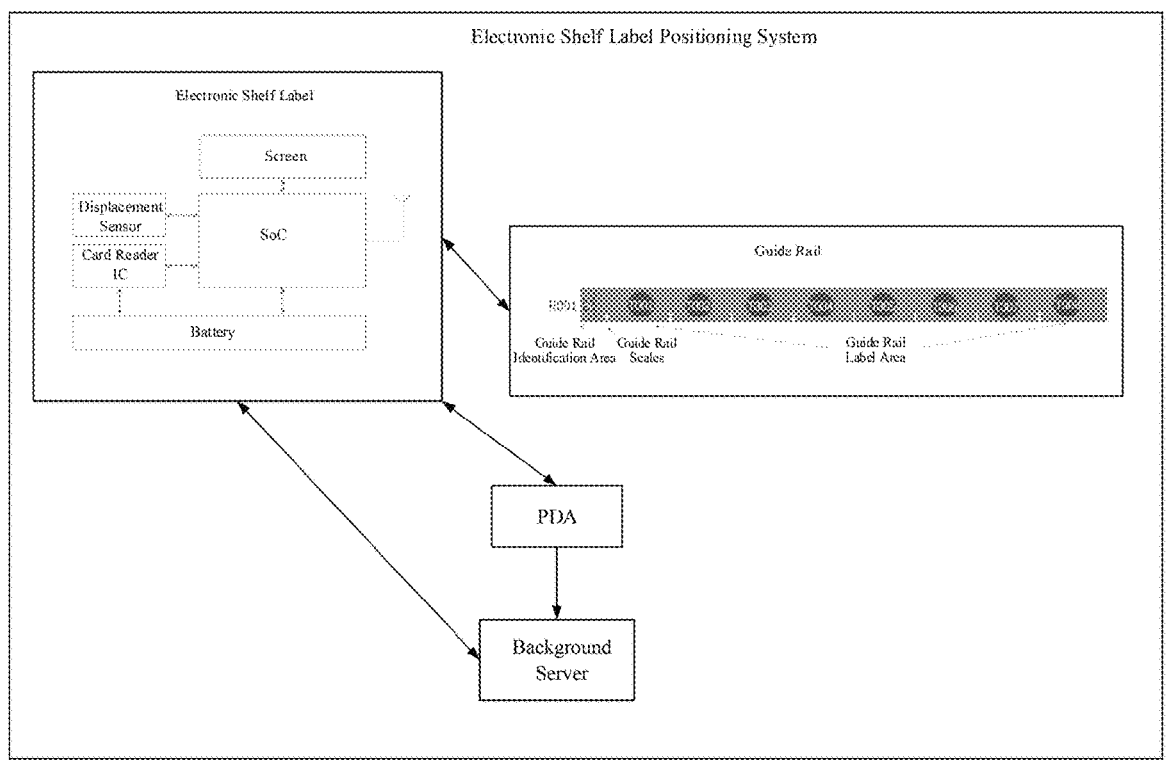
FIG. 3 is a schematic structural diagram of an electronic shelf label positioning system according to an embodiment of the present disclosure.

The present disclosure further provides an electronic shelf label positioning system as illustrated in FIG. 3, including the electronic shelf label, the guide rail, a PDA and a background server. The guide rail is installed on a commodity shelf.

The position of the guide rail may be obtained by binding the guide rail ID and the shelf ID, and the binding relationship is stored in the background server. The shelf label is installed on the guide rail, the wireless label ID on the guide rail is read and uploaded to the server, and the position of the guide rail where the electronic shelf label is located and the position of the shelf where the electronic shelf label is located are obtained by matching the wireless label ID.

Specifically, the PDA is configured to: scan a commodity shelf ID and a guide rail ID to form a binding relationship between a shelf and the guide rail ID, scan an electronic shelf label ID and a commodity ID to form a binding relationship between the electronic shelf label and a commodity, and transfer the binding relationships to the background server.

The electronic shelf label is configured to read a wireless label ID on the guide rail and transfer the wireless label ID to the background server.

The background server is configured to: send commodity and price information to be displayed on the electronic shelf label, determine the guide rail ID based on the wireless label ID, determine shelf information based on the guide rail ID and the binding relationship between the shelf and the guide rail ID, and obtain a corresponding position of the electronic shelf label based on the shelf information.

The PDA is a personal digital assistant.

In the embodiment of the present disclosure, the specific positioning process is as follows:

1. Preparation of the guide rail: the wireless labels are sequentially fixed to the guide rail label area by means of pasting or side insertion; the wireless label IDs are sequentially read by the PDA, and summarized to generate the guide rail ID to be written into the guide rail label. The summarized guide rail ID may also generate a two-dimensional code which is fixed to the guide rail identification area by means of pasting or side insertion. At this stage, a binding relationship between the guide rail ID and each wireless label ID is generated. In order to achieve a good positioning accuracy, the size of each wireless label is 3 cm to 5 cm.

Figure 4:
FIG. 4 is a schematic structural diagram of a guide rail prepared according to an embodiment of the present disclosure.

In FIG. 4, the content of R101 is T101T102T103T104T105T106T107T108, and all of the label IDs sequentially arranged on the guide rail can be obtained by reading or scanning the two-dimensional code once.

Figure 5:
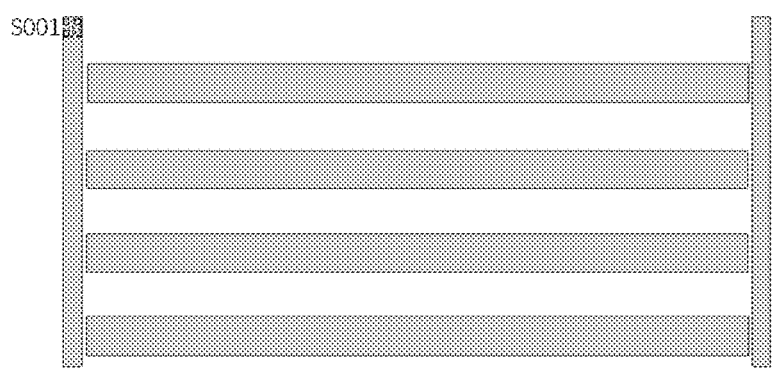
FIG. 5 is a schematic diagram of a shelf according to an embodiment of the present disclosure.

2. Pasting of a unique barcode of the store on the shelf. The barcode may be a one-dimensional code, a two-dimensional code or an RFID label, serving as the shelf ID. Please see S001 in FIG. 5.

Figure 6:
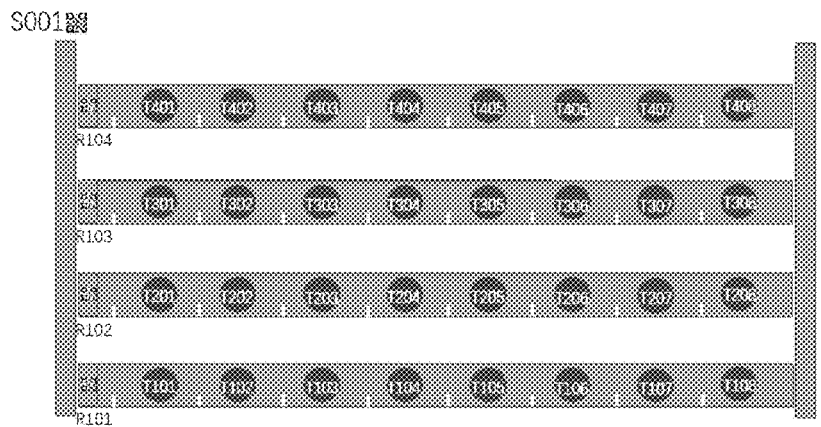
FIG. 6 is a schematic diagram of binding of shelf IDs and wireless labels according to an embodiment of the present disclosure.

3. Binding of the guide rail: the prepared guide rail is installed on the shelf; the PDA scans the shelf ID, and then sequentially scans the guide rail IDs of various floors to form the binding relationship between the shelf and each guide rail ID. According to the binding relationship between the guide rail ID and each wireless label, the binding relationship between the shelf ID and the wireless label can be established, as illustrated in Table 1 and FIG. 6.

TABLE 1

Binding Relationship Between Shelf Id and Wireless Label

| Position | Guide Rail ID | Wireless Label ID |
| --- | --- | --- |
| The fourth floor of the shelf S001 | R104 | T401T402T403T404T405T406T407T408 |
| The third floor of the shelf S001 | R103 | T301T302T303T304T305T306T307T308 |
| The second floor of the shelf S001 | R102 | T201T202T203T204T205T206T207T208 |
| The first floor of the shelf S001 | R101 | T101T102T103T104T105T106T107T108 |

Figure 7:
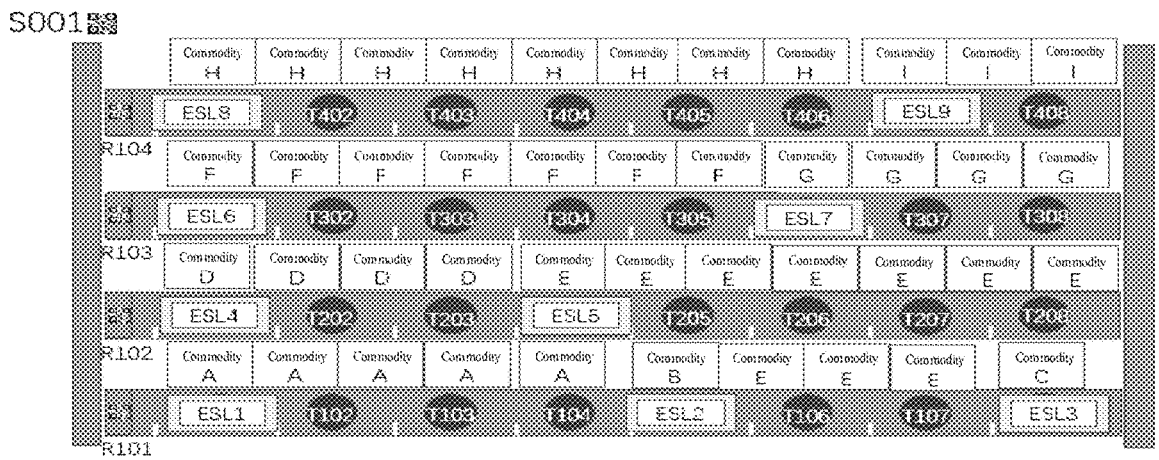
FIG. 7 is a schematic diagram of binding of shelf IDs, wireless labels, commodities and electronic shelf labels according to an embodiment of the present disclosure.

4. Installation of the electronic shelf labels: the electronic shelf labels and the position of the commodity follow the principle of alignment from the left side. The electronic shelf label ID and the commodity ID are scanned respectively to form the binding relationship between the electronic shelf label and the commodity. After the binding information is uploaded to the server, the server sends the commodity and price information to be displayed on the electronic shelf label, as illustrated in FIG. 7 and Table 2.

TABLE 2

Binding Relationship Between Commodities and Electronic Shelf Labels

| Electronic Shelf Label | Commodity |
| --- | --- |
| ESL1 | Commodity A |
| ESL2 | Commodity B |
| ESL3 | Commodity C |
| ESL4 | Commodity D |
| ESL5 | Commodity E |
| ESL6 | Commodity F |
| ESL7 | Commodity G |
| ESL8 | Commodity H |
| ESL9 | Commodity I |

5. The background server starts the positioning, and the electronic shelf label reads and transfers the wireless label on the guide rail. The server obtains the accurate guide rail ID by matching the binding relationships between the guide rail IDs and the wireless label IDs, and then obtains the shelf information from the binding relationships between the guide rail IDs and the shelf.

In this way, the position information of the corresponding commodity can be accurately obtained.

For example, the fifth electronic shelf label ESLS in FIG. 7 reads the label ID T204 on the guide rail. By looking up Table 1, it can be accurately acquired that the shelf label is located in a fourth label area in the guide rail on the second floor of the shelf S001.

Figure 8:
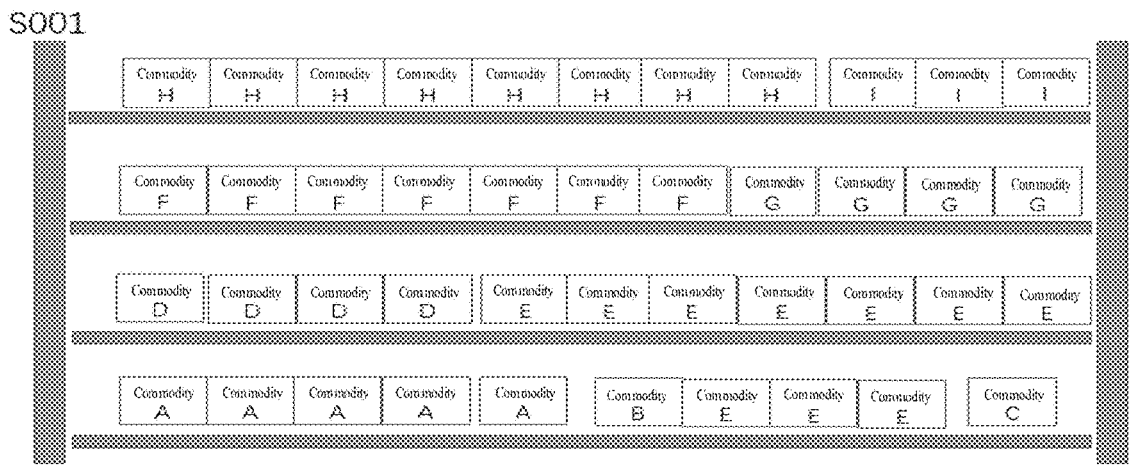
FIG. 8 is a display diagram of commodities according to an embodiment of the present disclosure.

In the embodiment of the present disclosure, the background server is further configured to generate a commodity display diagram based on the binding relationship between the electronic shelf label and the commodity and the position of the electronic shelf label, as illustrated in FIG. 8.

Figure 9:
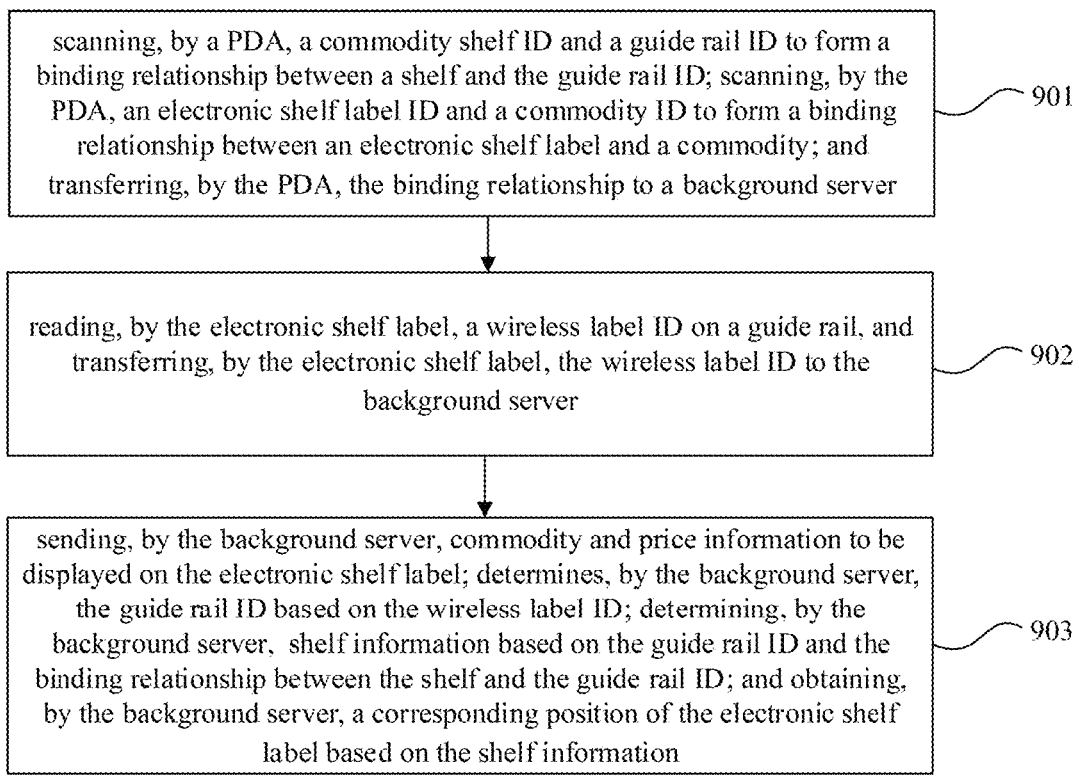
FIG. 9 is Flowchart 1 of an electronic shelf label positioning method according to an embodiment of the present disclosure.

FIG. 9 is Flowchart 1 of an electronic shelf label positioning method according to an embodiment of the present disclosure. As illustrated in FIG. 9, the method includes:

step 901: scanning, by a PDA, a commodity shelf ID and a guide rail ID to form a binding relationship between a shelf and the guide rail ID; scanning, by the PDA, an electronic shelf label ID and a commodity ID to form a binding relationship between an electronic shelf label and a commodity; and transferring, by the PDA, the binding relationship to a background server;

step 902: reading, by the electronic shelf label, a wireless label ID on a guide rail, and transferring, by the electronic shelf label, the wireless label ID to the background server;

step 903: sending, by the background server, commodity and price information to be displayed on the electronic shelf label; determines, by the background server, the guide rail ID based on the wireless label ID; determining, by the background server, shelf information based on the guide rail ID and the binding relationship between the shelf and the guide rail ID; and obtaining, by the background server, a corresponding position of the electronic shelf label based on the shelf information.

The electronic shelf label and the guide rail are those mentioned above, and the guide rail is installed on a commodity shelf.

Figure 10:
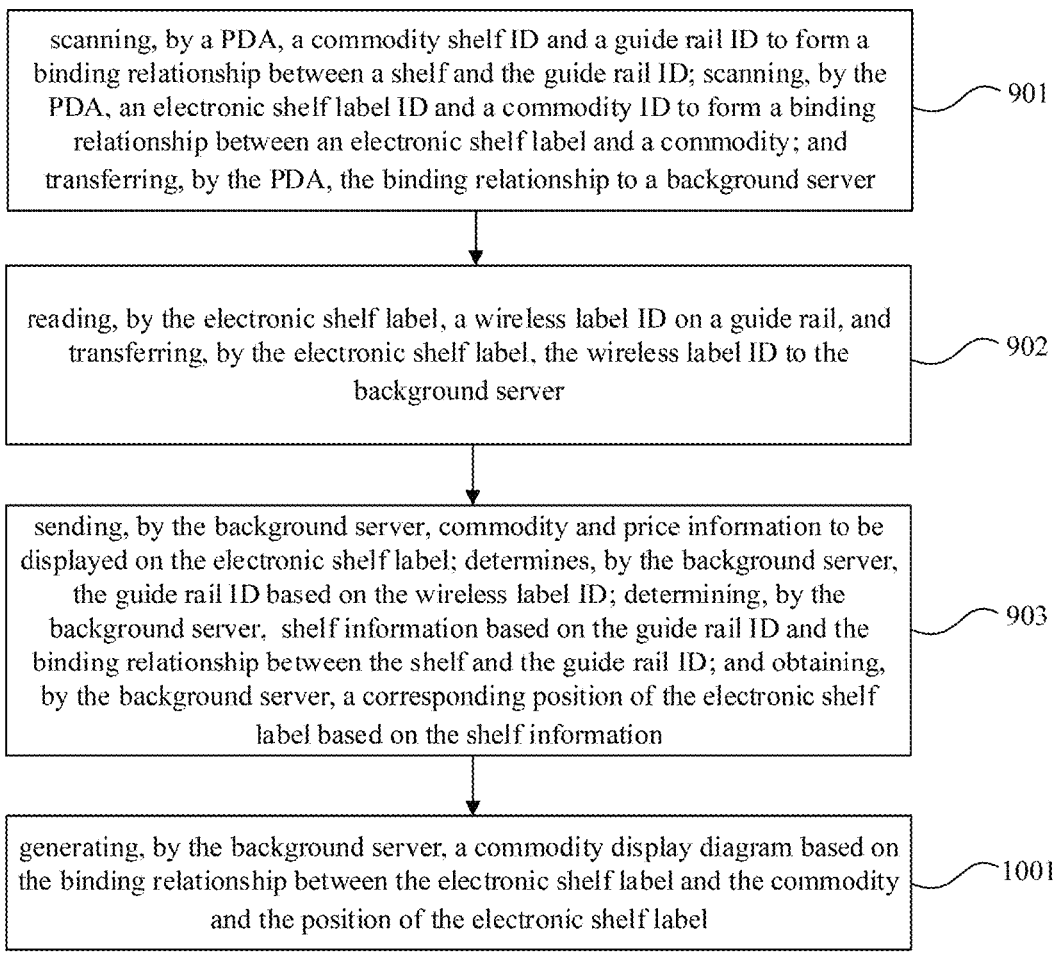
FIG. 10 is Flowchart 2 of an electronic shelf label positioning method according to an embodiment of the present disclosure.

In an embodiment of the present disclosure, as illustrated in FIG. 10, the method further includes:

step 1001: generating, by the background server, a commodity display diagram based on the binding relationship between the electronic shelf label and the commodity and the position of the electronic shelf label.

An embodiment of the present disclosure further provides a computer device, including a memory, a processor and a computer program stored in the memory and executable on the processor, and the processor is configured to execute the computer program to implement the electronic shelf label positioning method.

An embodiment of the present disclosure further provides a computer-readable storage medium storing a computer program which, when executed by a processor, implements the electronic shelf label positioning method.

An embodiment of the present disclosure further provides a computer program product, including a computer program which, when executed by a processor, implements the electronic shelf label positioning method.

Compared with the technical solutions of triangulation and UWB positioning in the prior art, the embodiments of the present disclosure provide an electronic shelf label positioning system, including an electronic shelf label, a guide rail, a PDA and a background server. The electronic shelf label includes a main control SoC, a card reader IC, a screen and a power supply device. The main control SoC is configured to control the screen display and to communicate with an AP. The IC card reader is configured to read a wireless label. The power supply device is configured to supply power to the electronic shelf label. The guide rail includes a guide rail identification area and a label area, wherein the label area is installed with a plurality of wireless labels each having a unique non-repeated ID number. The guide rail identification area is installed with an identity recognition device, which includes a guide rail ID consisting of the ID numbers of the wireless labels sequentially arranged and summarized. The present disclosure achieves the following advantageous effects:

(1) The provided electronic shelf label and guide rail achieve the accurate positioning of the electronic shelf label and the commodity, and the performance is stable and reliable, without being affected by a wireless environment. By the accurate positions, the picking and replenishment paths are optimized, and the operation efficiency is increased by 30%.

(2) The display diagram is automatically generated, so that the display management of each store by the retailer headquarter is really realized, and the management cost is reduced.

(3) With the displacement sensor, the wireless label will not be frequently read when the shelf label is still, and the overall power consumption is reduced by 25%.

(4) As to the hardware investment, only the wireless label is added to the guide rail, and in use, only an operation of binding the shelf and the guide rail is added, thus greatly reducing the investment cost for the retailers.

Those skilled in the art should appreciate that any embodiment of the present disclosure can be provided as a method, a system or a computer program product. Therefore, the present disclosure can take the form of a full hardware embodiment, a full software embodiment, or an embodiment combining software and hardware. Moreover, the present disclosure can take the form of a computer program product implemented on one or more computer usable storage mediums (including, but not limited to, a magnetic disc memory, CD-ROM, optical storage, etc.) containing therein computer usable program codes.

The present disclosure is described with reference to a flow diagram and/or a block diagram of the method, apparatus (system) and computer program product according to the embodiments of the present disclosure. It shall be appreciated that each flow and/or block in the flow diagram and/or the block diagram and a combination of flows and/or blocks in the flow diagram and/or the block diagram can be realized by computer program instructions. Those computer program instructions can be provided to a general computer, a dedicated computer, an embedded processor or a processor of other programmable data processing device to produce a machine, so that the instructions executed by the processor of the computer or other programmable data processing device produce means for realizing specified functions in one or more flows in the flow diagram and/or one or more blocks in the block diagram.

These computer program instructions may also be stored in a computer readable memory capable of guiding the computer or other programmable data processing devices to work in a particular manner, so that the instructions stored in the computer readable memory can produce manufacture articles including an instructing device which realizes function(s) specified in one or more flows in the flow diagram and/or one or more blocks in the block diagram.

These computer program instructions may also be loaded onto the computer or other programmable data processing devices, so that a series of operation steps are performed on the computer or other programmable data processing devices to produce a processing realized by the computer, thus the instructions executed on the computer or other programmable devices provide step(s) for realizing function(s) specified in one or more flows in the flow diagram and/or one or more blocks in the block diagram.

The above specific embodiments further explain the objectives, technical solutions and advantageous effects of the present disclosure in detail. As should be understood, those described above are merely specific embodiments of the present disclosure, and are not intended to limit the protection scope of the present disclosure. Any modification, equivalent substitution, improvement, etc. made within the spirit and principle of the present disclosure should be included in the protection scope of the present disclosure.

The invention claimed is:

1. A guide rail for installing an electronic shelf label, wherein the electronic shelf label comprises a main control SoC, a card reader IC, a screen and a power supply device; the main control SoC is configured to control the screen to display and configured to communicate with an AP; the card reader IC is configured to read a wireless label; and the power supply device is configured to supply power to the electronic shelf label;
the guide rail comprises a guide rail identification area and a label area;
the label area is installed with a plurality of wireless labels each having a unique non-repeated ID number; and
the guide rail identification area is installed with an identity recognition device, which comprises a guide rail ID including the ID numbers of the wireless labels sequentially arranged and summarized.

2. The guide rail according to claim 1, wherein the identity recognition device is a guide rail label in which the guide rail ID is written.

3. The guide rail according to claim 1, wherein the identity recognition device is a two-dimensional code generated by the guide rail ID.

4. The guide rail according to claim 1, wherein the guide rail label and the plurality of wireless labels are fixed on the guide rail by pasting or side insertion.

5. The guide rail according to claim 1, wherein the guide rail further comprises scales for assisting an alignment of commodities.

6. The guide rail according to claim 1, wherein the electronic shelf label further comprises a displacement sensor configured to detect whether the electronic shelf label moves.

7. The guide rail according to claim 6, wherein the main control SoC is further configured to control the card reader IC based on a displacement signal detected by the displacement sensor.

8. The guide rail according to claim 1, wherein the power supply device is a battery.

9. An electronic shelf label positioning system comprising: the guide rail and the electronic shelf label according to claim 1, a PDA and a background server, wherein the guide rail is installed on a commodity shelf;
the electronic shelf label comprises the main control SoC, the card reader IC, the screen and the power supply device; the main control SoC is configured to control the screen to display and configured to communicate with an AP; the card reader IC is configured to read a wireless label; the power supply device is configured to supply power to the electronic shelf label;
the PDA is configured to: scan a commodity shelf ID and the guide rail ID to form a binding relationship between a shelf and the guide rail ID, scan an electronic shelf label ID and a commodity ID to form a binding relationship between the electronic shelf label and a commodity, and transfer the binding relationships to the background server;
the electronic shelf label is configured to read a wireless label ID on the guide rail and transfer the wireless label ID to the background server; and
the background server is configured to: send commodity and price information to be displayed on the electronic shelf label, determine the guide rail ID based on the wireless label ID, determine shelf information based on the guide rail ID and the binding relationship between the shelf and the guide rail ID, and obtain a corresponding position of the electronic shelf label based on the shelf information.

10. The electronic shelf label positioning system according to claim 9, wherein the background server is further configured to generate a commodity display diagram based on the binding relationship between the electronic shelf label and the commodity and the position of the electronic shelf label.

11. The electronic shelf label positioning system according to claim 9, wherein the electronic shelf label further comprises a displacement sensor configured to detect whether the electronic shelf label moves.

12. The electronic shelf label positioning system according to claim 11, wherein the main control SoC is further configured to control the card reader IC based on a displacement signal detected by the displacement sensor.

13. The electronic shelf label positioning system according to claim 9, wherein the power supply device is a battery.

* * * * *